United States Patent [19]

Nimberger

[11] Patent Number: 4,974,308
[45] Date of Patent: Dec. 4, 1990

[54] METHOD FOR INTERCONNECTING AN INSTRUMENT MANIFOLD WITH AN ORIFICE PLATE ASSEMBLY

[75] Inventor: Spencer M. Nimberger, Houston, Tex.

[73] Assignee: Precision General, Inc., Houston, Tex.

[21] Appl. No.: 430,879

[22] Filed: Nov. 2, 1989

Related U.S. Application Data

[62] Division of Ser. No. 335,143, Apr. 7, 1989, Pat. No. 4,920,626.

[51] Int. Cl.$^5$ .............................................. B23P 11/02
[52] U.S. Cl. ..................................... 29/469; 29/525.1
[58] Field of Search ............... 285/212, 219, 220, 363; 403/259, 262, 287; 73/201, 861.42, 861.61; 137/861, 884; 29/428, 700, 525.1, 282, 890.124, 890.125, 469

[56] References Cited

U.S. PATENT DOCUMENTS

| | | | |
|---|---|---|---|
| 2,343,235 | 2/1944 | Bashark | 285/89 X |
| 2,852,281 | 9/1958 | Ellis . | |
| 2,919,147 | 12/1959 | Nenzell | 285/89 |
| 3,106,413 | 10/1963 | Hamlin et al. | 285/212 |
| 3,151,093 | 10/1964 | Lyon | 285/158 |
| 4,042,020 | 8/1977 | Wellstein | 285/220 X |
| 4,193,617 | 3/1980 | Hitz | 285/363 X |
| 4,582,089 | 4/1986 | Nimberger | 285/12 X |
| 4,672,728 | 6/1987 | Nimberger | 29/469 X |
| 4,688,830 | 8/1987 | Musinger et al. | 285/220 X |
| 4,822,075 | 4/1989 | Reaux | 285/363 X |

Primary Examiner—Mark Rosenbaum
Assistant Examiner—Frances Chin
Attorney, Agent, or Firm—Browning, Bushman, Anderson & Brookhart

[57] ABSTRACT

Improved methods and apparatus are provided for structurally interconnecting an instrument manifold with a differential pressure assembly having a pair of tapered NPT threaded outlet ports each adjoining an exterior body surface. First and second connector flanges are provided each having a through passageway for transmitting a pressure signal from the corresponding NPT outlet port in the differential pressure assembly to an inlet port in an instrument manifold. Each connector flange includes a tapered threaded end, a flange end, and a threaded portion fixed between the threaded end and the flange end. The apparatus also includes first and second stabilizer members, and first and second tensioning nuts for exerting a compressive force on the stabilizer members such that the stabilizer members will transmit substantially all radially-directed forces to the differential pressure assembly. According to the method of the present invention, each connector flange is rotated for obtaining sealing engagement between each connector flange and a respective port in the differential pressure assembly, and the one or more apertures in the flange end are rotated to a preselected rotational position prior to tightening the tension nuts for exerting force on the stabilizer members.

17 Claims, 3 Drawing Sheets

METHOD FOR INTERCONNECTING AN INSTRUMENT MANIFOLD WITH AN ORIFICE PLATE ASSEMBLY

This is a division, of application Ser. No. 335,143, filed Apr. 7, 1989 now U.S. Pat. No. 4,920,626.

FIELD OF THE INVENTION

The present invention relates to connector flanges for structurally interconnecting an instrument manifold with a differential pressure assembly and, more particularly, relates to connector flanges which reliably provide independent structural interconnection of an orifice plate assembly and an instrument manifold while also passing a pair of fluid pressure signals from a corresponding pair of NPT ports in the orifice plate assembly through the instrument manifold and thence to a pressure transducer for detecting pressure differential across the orifice plate assembly and thereby measuring flow rate.

BACKGROUND OF THE INVENTION

Instrument manifolds are commonly employed in differential pressure systems between the source of the differential pressure and the pressure transducer, monitor or meter. In a typical installation, a three-valve or five-valve instrument manifold is installed between an orifice plate assembly and a differential pressure transducer to normally transmit a pair of pressure signals to the transducer, and to allow for intermittent testing of the measuring system while line fluid passes through the orifice plate assembly. The instrument manifold may be connected to the orifice plate assembly by either remote couplings or direct (close) couplings. While the remote coupling technique provides a high degree of flexibility with respect to placement of the instrument manifold, direct or close coupling of the orifice plate assembly and the instrument manifold is often preferred to reduce travel of the pressure signals and thus increase system accuracy, to reduce fluid-tight interconnections and thereby increase pressure signal reliability, to simplify rod-out operations, and to significantly reduce instrument manifold installation costs.

Instrument manifold installation costs can most dramatically be reduced when the close coupling equipment independently provides the structural connection between the orifice plate assembly and the instrument manifold. While the savings from this installation technique are significant, the use of direct or close coupling between an orifice plate assembly and an instrument manifold has long been limited, primarily due to justified concern that over an extended period of time the close coupling interconnection may be unable to withstand the industrial environment in which these components are placed. In many cases, this concern is due to the periodic or continuous presence of high vibration of the fluid line in which the orifice plate assembly is placed. The concern of the system operator is that vibration of the orifice plate assembly will be transmitted through the close coupling connectors to the instrument manifold, resulting in leakage and/or structural failure of the close coupling connectors. This problem is not easily overcome, since any mechanism which either reduces this vibration or is adapted to withstand this vibration over a long period of time must be cost effective and easy to install, preferably does not increase the relatively short distance between the orifice plate assembly and the instrument manifold, and ideally is highly versatile so that it can be employed between various types of differential pressure assemblies and instrument manifolds.

Many types of coupling devices are not suitable for transmitting pressure signals from an orifice plate assembly to an instrument manifold. U.S. Pat.No. 2,852,281, for example, discloses a fluid pressure coupling that uses a wedged sealing sleeve. Orifice plate assemblies are conventionally provided with tapered NPT threads which form a fluid-tight metal-to-metal seal between the orifice plate assembly body and the threaded coupling, and accordingly a coupling with straight threads and an O-ring seal is not practically usable with conventional orifice plate assemblies. An end portion of each coupling adjacent the instrument manifold must also be rotatable, so that apertures within that end portion can be rotatably aligned with corresponding apertures in the instrument manifold flange for structurally interconnecting each coupling with the instrument manifold. U.S. Pat. Nos. 2,343,235, 2,919,147, and 3,151,893 each disclose couplings which are intended to enable one end of a coupling to be rotated at a selected angular position while maintaining a fluid-tight connection between the other end of the coupling and the body to which the coupling is connected. Each of these couplings, however, again discloses straight threads rather than tapered NPT threads of the type used in a conventional orifice plate assembly. Moreover, the couplings do not include a pair of apertures or other suitable means for mechanically connecting the free end of the coupling with a flange of an instrument manifold. Finally and most importantly, these patents do not teach a practical solution to the problem which has reduced the commercial use of direct couplings between an orifice plate assembly and an instrument manifold, namely to provide a mechanism which can withstand the previously described vibrational forces over a long period of time, and thereby overcome the leakage concern.

Couplings which structurally interconnect an orifice plate assembly with an instrument manifold thus must satisfy special problems inherent in this application,.and generally are specially adapted for this particular use. Direct coupling of an orifice plate assembly with an instrument manifold is conventionally accomplished by a pair of nipples each having NPT threads at each end, with a "football" mechanism including a pair of through apertures provided at the instrument manifold end of each nipple for mechanically interconnecting the coupling to the instrument manifold. U.S. Pat. No. 4,672,728 discloses a pair of nipples for structurally interconnecting an instrument manifold with an orifice plate assembly and for passing the pair of signals from the orifice plate assembly through the instrument manifold and to a pressure transmitter. This patent also discloses a preferred instrument manifold having a removable flange connected to the manifold body with a pair of specially adapted fittings for forming a fluid-tight connection between each football and the corresponding fitting. Apertures in each of the footballs are aligned with corresponding apertures in the instrument manifold flange, so that the instrument manifold can be structurally connected to the orifice plate assembly by the pair of nipples and footballs. Other types of direct or close couplings between an instrument manifold and an orifice plate assembly are shown in U.S. Pat. No. 4,672,728, which also depicts the previously described NPT ports formed in a pair of circular flange bodies of an orifice plate assembly.

The direct coupling connectors disclosed in the latter two patents each serve the function of sealing an NPT port in an orifice plate assembly with a corresponding port in an instrument manifold, and also provide means for independently structurally interconnecting the instrument manifold with the orifice plate assembly. While these connectors have been widely used, they often do not satisfy the customer's reliability concern for high vibration applications. When placed in such an environment, the vibrating connectors, coupled with the weight of the instrument manifold and often the weight of the pressure transducer, may cause the nipples to loosen, thereby resulting in leakage of pressure and thus poor signal reliability. These connectors are also particularly susceptible to leakage, or even structural failure, when the instrument manifold (or transmitter connected thereto) is subjected to a vector force perpendicular to a plane passing through each of the axes of the connectors. Since the connectors are spaced apart, they are capable of withstanding a reasonable vector force within this plane, but are not able to withstand a similar magnitude vector force perpendicular to this plane. Accordingly, customers faced with such a high vibration environment, or faced with other environments which would cause one to question whether the nipples can continually withstand the forces which may act on the instrument manifold without allowing signal pressure leakage, often utilize the much more expensive and less desirable installation technique of providing a separate "platform" for mounting the instrument manifold structurally separate from the orifice plate assembly, and then interconnect the orifice plate assembly and the remote instrument manifold with flexible fluid lines.

The disadvantages of the prior art are overcome by the present invention, and improved methods and apparatus are hereinafter provided for reliably forming a structural interconnection between a standard instrument manifold and an orifice plate assembly using a pair of connector flange assemblies as described herein.

SUMMARY OF THE INVENTION

A suitable environment for the apparatus according to the present invention includes an orifice plate assembly or other differential pressure assembly, an instrument manifold and a pressure transducer, gauge, monitor or meter. The orifice plate assembly is suitable for placing along a flow line, and includes a pair of NPT ports in fluid communication with opposing sides of an orifice plate. The pressure differential across the orifice plate is transmitted through these ports and passed through the instrument manifold to the pressure transducer to measure the flow of line fluid through the orifice plate assembly. The external surface of the orifice plate assembly adjacent the NPT ports is typically curved, but could be planar. The instrument manifold is provided with an orifice-side flange having a pair of pressure receiving ports and a plurality of apertures surrounding each of those ports for structurally interconnecting the instrument manifold with each of a pair of stabilized connector flange assemblies, which in turn are connected to the orifice plate assembly.

Each of the stabilized connector flange assemblies comprises a connector flange having an NPT threaded end for engagement with a corresponding port in a differential pressure assembly, and a flange end having a pair of apertures for receiving bolts to interconnect each connector flange assembly to the instrument manifold. Each connector flange has a straight fluid passageway for transmitting pressure signals from the corresponding NPT port to the instrument manifold and thence to the pressure transducer. A guiding portion of each connector flange is axially spaced between the NPT threads and the flange end, and preferably has a cylindrical outer configuration. An external threaded portion of each connector flange is axially spaced between the guide portion and the flange end. Each connector flange assembly further comprises a stabilizer foot having a cylindrical internal surface for sliding engagement with the external surface of the guide portion of the connector flange, and a pair of stabilizer members each spaced radially a substantial distance from the corresponding NPT threads for engaging the outer surface of the differential pressure assembly adjacent the NPT port. Finally, each stabilized connector flange assembly includes a tensioning nut for threaded engagement with the threaded portion of the connector flange so as to exert a substantial axially directed force on the stabilizer foot, thereby forcing the stabilizer foot into rigid engagement with the orifice plate assembly.

In its assembled position, the stabilizer foot prevents movement in any radial direction of the connector flange with respect to the differential pressure assembly, so that the instrument manifold once bolted to the pair of connector flange ends is thus structurally connected to the differential pressure assembly. Moreover, the NPT threads of each of the connector flanges are continually in tension caused by the axially directed force of the tensioning nut, which further reduces the likelihood that either of the connector flanges will become loosened from the differential pressure assembly. All forces which might be exerted on the instrument manifold may be passed to the differential pressure assembly through the pair of stabilized connector flange assemblies, and primarily through the pair of stabilizer feet. Accordingly, high radially-directed forces are not placed on the NPT threads of either connector flange, thereby substantially increasing system reliability and reducing concern for pressure signal error.

According to the method of the present invention, a tensioning nut and a stabilizing foot are each placed about a corresponding connector flange, and each connector flange is threaded to a corresponding port in the orifice plate assembly so that the NPT threads of the connector flange form a fluid-tight metal-to-metal seal. The flange end of each connector flange is thereafter rotated so that its apertures may be aligned with the corresponding apertures in the orifice flange end of the instrument manifold, and sealed engagement of the NPT threads is maintained while each connector flange is so rotated. In addition to being rotated for proper alignment with the instrument manifold, the connected flanges may need to be rotated so that the flange end surfaces of the two connector flanges are positioned at approximately the same axial location, so that the single flange of the instrument manifold can be sealingly mated to the two structurally independent flange ends of the connector flanges. Once the flange ends have been properly rotated, each of the tensioning nuts is rotated on the threaded portion of a corresponding connector flange to force each of the stabilizer feet into fixed engagement with the outer surface of the orifice plate assembly adjacent the corresponding NPT port. Finally, conventional bolts may be used to structurally interconnect the flange end of each of the connector flanges with the instrument manifold flange, thereby also energizing a fluid-tight seal between the instrument manifold and each of the stabilized connector flange assemblies.

It is an object of the present invention to provide improved methods and apparatus for reliably interconnecting an instrument manifold with a differential pressure assembly, such that the instrument manifold is structurally interconnected thereto by a pair of stabilized connector flange assemblies which substantially reduce or eliminate the likelihood of fluid pressure loss between the differential pressure assembly and the instrument manifold.

It is a further object of the present invention to structurally interconnect an instrument manifold with a differential pressure assembly utilizing a pair of stabilized connector flange assemblies which do not significantly increase the cost or complexity of forming a fluid-tight connection between the instrument manifold and the differential pressure assembly, and which substantially reduce the likelihood that vibration will cause leakage of fluid pressure over a prolonged period of time.

It is a further object of the present invention to interconnect a differential pressure assembly and an instrument manifold using a pair of stabilized connector flange assemblies each including a connector flange, a stabilizer foot, and a tensioning nut. According to the method of the present invention, the tensioning nut and stabilizer foot are slid over the NPT threaded end of each connector flange, and each connector flange is thereafter rotated so that its threaded end forms a metal-to-metal seal with the corresponding NPT port in the differential pressure assembly. While this metal-to-metal seal is maintained, each connector flange is rotated so that (1) apertures within each flange end will be aligned with corresponding apertures in the instrument manifold, and (2) the flange end surfaces of the two connector flanges are at approximately the same axial location, i.e., so that their planar end surfaces lie within or are very close to being within a single plane perpendicular to the connector flange axes, thereby enabling the single planar orifice plate facing end surface of the instrument manifold to subsequently become secured and sealed to the pair of connector flange end surfaces. The tensioning nut is thereafter rotated so that each stabilizer foot is brought into secured engagement with the differential pressure assembly, thereby substantially reducing or eliminating radially directed forces between the NPT threads of the connector flange and the corresponding threads of the differential pressure assembly. Conventional bolts may thereafter be passed through the apertures in each connector flange and the corresponding apertures in the instrument manifold, such that the instrument manifold may be supported from the differential pressure assembly solely by the pair of stabilized connector flange assemblies.

It is a feature of the present invention that the same stabilized connector flange assemblies may be used to reliably interconnect a conventional instrument manifold with various types of differential pressure assemblies, including orifice plate assemblies having either curvilinear or planar surfaces adjacent its NPT ports.

It is a further feature of the present invention that the stabilized connector flange assemblies may be used to interconnect various types of instrument manifolds with a differential pressure assembly, including instrument manifolds having flanges integral with the manifold body and instrument manifolds having removable flanges.

It is another feature of the present invention that the pair of connector flange assemblies of the present invention which structurally interconnect an instrument manifold with a differential pressure assembly do not significantly increase the flow path length between the differential pressure assembly and the instrument manifold, thereby maintaining high system reliability.

A significant advantage of the stabilized connector flange assemblies according to the present invention is that an instrument manifold may be reliably mounted to and be solely supported by a differential pressure assembly utilizing a pair of stabilized connector flange assemblies, wherein vibration of the differential pressure assembly will not cause the connector flange assemblies to become loosened from the differential pressure assembly, so that system leakage is substantially reduced or eliminated. Accordingly, significant installation cost savings can be realized by utilizing the stabilized connector flange assemblies of the present invention, and avoiding the expense of providing a support or platform structurally independent of the orifice plate assembly for supporting the instrument manifold and/or pressure transducer.

These and further objects, features and advantages of the present invention will become apparent from the following detailed description, wherein reference is made to the figures in the accompanying drawings.

DETAILED DESCRIPTION OF PREFERRED EMBODIMENTS

Figures 1, 2:
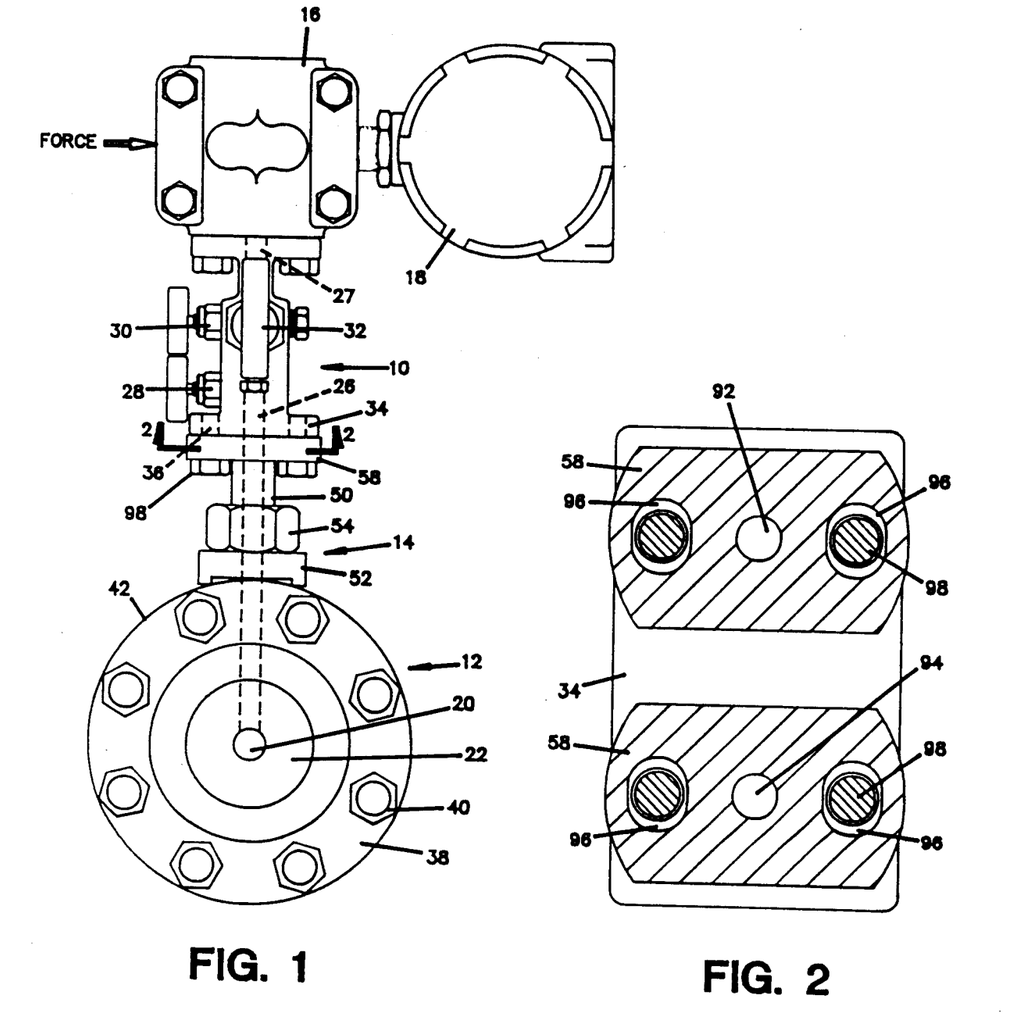
FIG. 1 is a simplified pictorial view illustrating one of a pair of stabilized connector flange assemblies of the present invention structurally interconnecting an instrument manifold with an orifice plate assembly.
FIG. 2 is a cross-sectional view of a stabilized connector flange assemblies taken along line 2—2 in FIG. 1.

FIG. 1 depicts a five-valve instrument manifold 10 mounted to an orifice plate assembly 12 by a pair of stabilized connector flange assemblies 14 according to the present invention. A pressure transducer 16 and its accompanying electronics head 18 are mounted to the opposing side of the instrument manifold 10, with the transducer 16 serving to measure the flow rate of fluid through the flow line 20 and through the orifice plate 22 therein. The orifice restriction creates a pressure differential across the orifice plate 22, and first and second pressure signals are transmitted through the corresponding tapered NPT ports 24 (see FIG. 3) in the orifice plate assembly 12, through the respective inlet ports 26 and outlet ports 27 in the instrument manifold 10, and to the pressure transducer. During normal use, the valve 32 and its corresponding valve on the blind side of manifold 10 are thus opened for transmitting respective first and second pressure signals to the pressure transducer. These valves may, however, be closed and valve 30 and its corresponding valve opened for intermittently testing the system while line fluid continues to pass through the orifice plate assembly 12. Finally, a bleed valve 28 is provided for venting pressure during the testing operation. This testing procedure is well known in the art and thus is not described herein.

The instrument manifold 10 is shown with flange 34 integral with the manifold body on its orifice plate side. The flange 34 has a plurality of through apertures 36 each radially outward of one of the respective inport ports 26. Bolts may thus be threaded through these apertures for securing an instrument manifold to a football member, as shown in U.S. Pat. No. 4,582,089. The orifice plate assembly 12 includes a pair of disk-shaped bodies 38 secured together by bolts 40, with each of the bodies 38 having an external curvilinear surface 42 adjoining a respective NPT threaded outlet port. Although only one stabilized connector flange assembly 14 is shown in FIG. 1, it should be understood that a second substantially identical flange assembly is behind the depicted assembly 14, so that both first and second flange assemblies are used to independently mount the instrument manifold 10 to the orifice plate assembly 12. Each of the flange assemblies 14 includes a connector flange 50 having a flange end 58, a stabilizer foot 52, and a tensioning nut 54. Each assembly 14 may thus replace a respective nipple and football as described in U.S. Pat. No. 4,582,089, although the flange assemblies as herein described are significantly better able to withstand vibrational forces acting on the instrument manifold, thereby ensuring high signal pressure reliability from the orifice plate assembly 12 to the transducer 16 over a long period of time. Moreover, the flange assemblies of the present invention are able to transmit forces to the flange assembly which are applied to the instrument manifold or pressure transducer, particularly vector forces perpendicular to a plane passing through the axis of the flange assemblies. Accordingly, an intermittent force applied to the pressure transducer as shown in FIG. 1 can be much more safely transmitted to the orifice plate assembly 12 by the connector flange assemblies of the present invention than was possible with prior art connector flanges. As a result, installation costs are reduced (no special platform required), yet reliable signals are transmitted, and maintenance costs are minimized.

FIG. 2 depicts in cross-section the pair of flange ends of the stabilized connector flange assemblies 14 according to the present invention, and the relationship of these flange ends 58 to the flange 34 of the manifold 10. FIG. 2 thus depicts the cylindrical-shaped upper and lower flow passageways 92, 94 through the respective upper and lower flange assemblies, with each flow passageway placing a respective port in the orifice plate assembly 12 in fluid communicatin with a respective inlet port 26 of the instrument manifold. Each flange end 58 has a pair of through apertures 96 on radially opposing sides of each of the respective passageways 92, 94. Each aperture 96 may have a generally elliptical cross-sectional configuration to better accomodate minor misalignment between respective apertures in the connector flange and the instrument flange. Accordingly, the semimajor axis of each aperture is generally parallel to a plane passing through the axes of the passageways 92, 94. A bolt 98 is received within each aperture, and is threaded to the flange 34 of the instrument manifold to structurally interconnect the instrument manifold and the connector flange.

Figure 3:
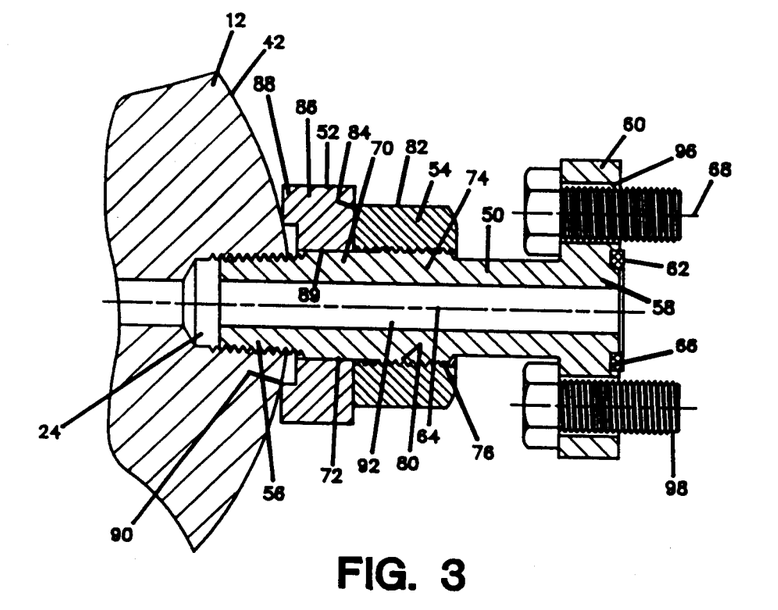
FIG. 3 is a more detailed cross-sectional view of one of the stabilized connector flange assembly shown in FIG. 1 without an instrument manifold connected thereto.

FIG. 3 depicts in greater detail one of the stabilized connector flanges according to the present invention. The stabilizer foot 52 and the tensioning nut 54 are each mounted on the connector flange 50. The connector flange 50 includes a tapered thread NPT end 56 fixed thereon for metal-to-metal sealing engagement with a corresponding port 24 in the orifice plate assembly, and an opposing flange end 58 fixed thereon and including flange component 60 having first and second through apertures 96 as described above. The connector flange 50 has a central axis 64, and a cylindrically-shaped through passageway 92 formed about the central axis 64 for transmitting a pressure signal from the NPT outlet port in the orifice plate assembly to a corresponding inlet port of the instrument manifold. Each of the apertures 96 has an axis 68 parallel with the central axis of its respective connector flange.

Each connector flange 58 also includes a guide portion 70 fixed thereon axially between the threaded end and the flange end. The guide portion 70 has an external cylindrically-shaped guide surface 72 of a uniform outer diameter. A threaded portion 74 is axially fixed on the connector flange between the guide portion and the flange end, and has straight-wall external threads 76. The length of the through passageway 92 in each connector flange 50 is relatively short, and preferably less than about 1.3 times the maximum height (in the radial direction) of the flange component 60. In a typical installation, the maximum height of component 60 is approximately 2.50 inches, and the centerline spacings between the apertures 96 is 1.625 inches to correspond with the centerline spacings in the apertures of the instrument manifold for receiving the bolts 98.

The tensioning nut 54 has internal threads 80 for threaded engagement with the external threads on the connector flange 50, and has straight-wall exterior surfaces 82 to facilitate torqued rotation of the nut 54 with a conventional wrench. The nut 54 includes a substantially planar end surface 84 for engagement with the stabilizer foot 52.

The stabilizer foot 52 preferably has a generally parallelepiped body portion 86 with a pair of stabilizer members 88 affixed thereto and projecting axially toward the orifice plate assembly. The internal cylindrically-shaped surface 89 in the body portion 86 has a diameter only slightly greater than the external cylindrical guide surface 72 on the connector flange, so that the foot 52 can move axially but is radially fixed with respect to the connector flange. As shown in FIG. 3, the stabilizer members 88 each have a rectangular cross-sectional configuration extending along the length of each foot. Each of the stabilizer members 88 are substantially radially outward of the NPT threads on the connector flange, and efficiently provide outriggers for rigid engagement with an external surface of the orifice plate assembly 12. The stabilizer members may be spaced radially a distance of at least 1.5 times the nominal diameter of the tapered NPT threads on the connector flange, and preferably at least 1.5 times the uniform diameter of the external guide surface 72 on the connector flange, so that the stabilizer members serve as outriggers and perform a significant mechanical advantage of efficiently transmitting radially-directed forces between the orifice plate assembly and the connector flange.

Figure 4:
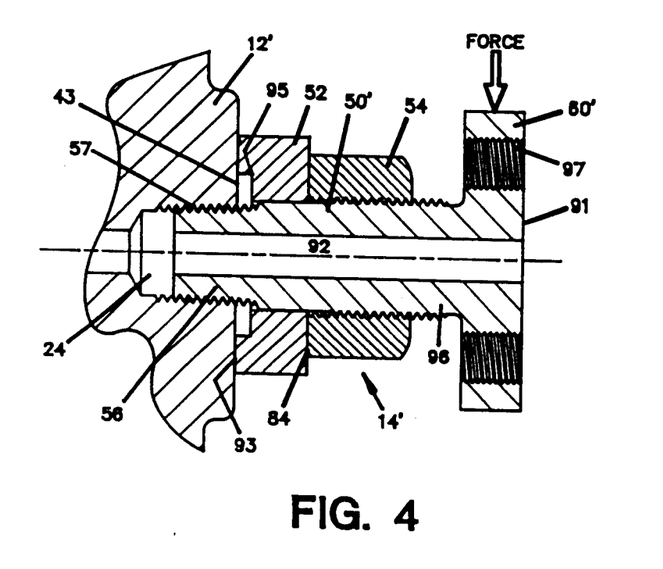
FIG. 4 is a cross-sectional view of another embodiment of a stabilized connector flange assembly connected to another type of differential pressure assembly.

Each stabilizer member 88 thus has a pair of contact points thereon for engagement with a corresponding body surface of the orifice plate assembly. Those contact points lie along and thus define a linear contact line 90 for stabilized engagement with the curvilinear exterior surface 42 of the orifice plate assembly 12 shown in FIG. 2. If the exterior surface of the orifice plate assembly is planar, the configuration of the stabilizer members allows them to engage and also be rigidly secured thereto. Thus the stabilizer foot 52 may be used for engaging an orifice plate assembly with either a curvilinear exterior surface, as shown in FIG. 3, or a substantially planar exterior surface, as shown in FIG. 4. The length of the stabilizer foot (in the direction of the elongate stabilizer members) is not critical, but generally approximates the nominal diameter of the tensioning nut. FIG. 3 also depicts an elastomeric seal ring 62 radially spaced between the through passageway 92 in the connector flange and the bolts 98, so that the elastomeric seal 62 engages a planar end surface of the instrument manifold and seals therebetween when the bolts 98 secure the instrument manifold to the connector flange. Accordingly, the instrument-facing face of the connector flange 50 is provided with a circular groove 66 for receiving the elastomeric seal 62.

The connector flange 50' shown in FIG. 4 is similar to the previously described flange 50, but has a threaded aperture 97 for receiving the threaded ends of conventional bolts 98 passing through corresponding apertures in the instrument manifold. The instrument-side face surface 91 of the flange 50' is planar, and is sealed to the instrument manifold by an elastomeric seal carried on the instrument manifold. The alternate flange assembly 14' shown in FIG. 4 may be slightly shorter than the assembly 14 described above, since axial space need not be provided for bolt heads between the tensioning nut 54 and the flange component 60'. FIG. 4 thus depicts the planar end surfaces 93 of foot 52 in fixed engagement with the planar surface 43 of the differential pressure assembly 12' adjacent the NPT port 24.

The connector flange assembly of the present invention is thus significantly better able to withstand a vector force as shown in FIG. 4 and reliably transmit that force to the orifice plate assembly than prior art connector flanges. The force would typically be applied to the instrument manifold or pressure transducer, although the benefit of the invention can be understood by considering the force applied to the flange end of the connector flange, as depicted: The threaded end 56 of the connector flange is structurally weak, but the applied force is transmitted to the orifice plate assembly 12' by the foot 52 and its stabilizer members which are spaced radially outward of the threads 57. Accordingly, this inherently weak threaded end 56 is avoided, and portion 96 of the connector flange (which may be the new weak point) can easily have a wall thickness substantially greater, preferably at least 25% greater, than the threaded end 56. Since portion 96 is both structurally stronger and physically closer to the applied force than the threaded end 56, it is significantly less likely to fail than the threaded ends of prior art connectors in response to the application of the force.

The method for structurally interconnecting an instrument manifold with an orifice plate assembly will now be described. As previously indicated, first and second connector flanges, first and second stabilizer feet and first and second tensioning nuts are provided as described above. A respective tensioning nut is then placed over the threaded end of a corresponding connector flange and is threaded to the external threads thereon. In order to provide sufficient room for subsequently obtaining a reliable metal-to-metal seal between a connector flange and the orifice plate assembly, the tensioning nut is preferably fully threaded on a respective connector flange so that it is closely adjacent the flange end thereof. Thereafter, a corresponding stabilizer foot is placed over the threaded end of a respective connector flange, and its internal cylindrical surface slid over the external cylindrical surface on the connector flange. Each of the first and second connector flanges may then be rotated so that its NPT threads obtain the desired metal-to-metal seal with the corresponding threaded NPT port in the orifice plate assembly. In particular, it should be noted that no other sealing member need be used to establish a reliable seal between the orifice plate assembly and the connector flange. The construction of NPT threads is such that the desired metal-to-metal seal may be maintained over at least approximately one turn of the NPT threads. Accordingly, while this metal-to-metal is maintained, each of the connector flanges are rotated so that its apertures 96 will be aligned with the corresponding apertures in the instrument manifold. For instance, assuming that the corresponding apertures in the instrument manifold are horizontally spaced from but vertically at the same elevation of a corresponding inlet port in the instrument manifold, the apertures 96 in each of the connector flanges will be aligned so that the apertures 96 in each of the flange assemblies are similarly at the same vertical elevation, with each aperture 96 being horizontally spaced from passageway 92.

In order to obtain a reliable seal between the single face of the instrument manifold and both of the structurally independent end surfaces of the pair of connector flanges, it may be necessary to further tighten one of the connector flanges with respect to the orifice plate assembly, so that the end surfaces of the first and second connector flanges are at approximately the same axial position. In other words, the end surfaces of the first and second connector flanges should be spaced axially no more than approximately 0.020 inches apart to ensure that each of the connector flanges will be able to form a reliable seal with the instrument manifold. This final alignment of the connector flanges to ensure that their instrument facing end surfaces are approximately within a single plane, i.e., flat with respect to each other, will be accomplished with successive one-half turns of one or both of the connector flanges, since radially opposing apertures 96 in each of the connector flange ends must also be aligned with the corresponding apertures in the instrument manifold. The spacing between the individual threads 80 on each connector flange thus provides sufficient axial movement of each connector flange resulting from a one-half turn to maintain the desired flatness of the pair of end surfaces (within approximately 0.020 inches).

Once the connector flanges have been properly rotated so that each of their apertures 96 are aligned with the corresponding apertures in the instrument manifold and the flange ends are axially aligned or "flat" with respect to each other as described above, each of the tensioning nuts may be threaded so that its end surface 84 engages the corresponding end surface on the stabilizer foot, and forces the stabilizer members into engagement with the corresponding exterior surface of the orifice plate assembly. A rotational torque of at least 200 foot pounds may be applied to each tensioning nut, which will exert a substantially axially-directed force on each of the stabilizer feet to force each foot into rigid engagement with the orifice plate assembly. This compressive force on each of the feet will also place the NPT threads of each connector flange in tension, which further reduces the likelihood of a connector flange inadvertently becoming loose from the orifice plate assembly under high vibrational forces which might otherwise cause leakage of a pressure signal to the transducer.

After each of the connector flanges has been rigidly secured to the orifice plate assembly as described above, conventional bolts 98 may be used for interconnecting the flange end of each of the connector flanges with the instrument manifold, since the apertures in the flange end of each connector flange will already be aligned with the corresponding apertures in the instrument manifold. Once the instrument manifold 10 has been rigidly secured to the orifice plate assembly 12 by the first and second connector flange assemblies as described herein, another instrument manifold and one or more pressure transducers, sensors or measurement instruments may be connected to the instrument manifold 10, so that the connector flanges of the present invention may independently structurally support not only an instrument manifold from the orifice plate assembly, but one or more instrument manifolds and/or pressure transducers.

Figure 5:
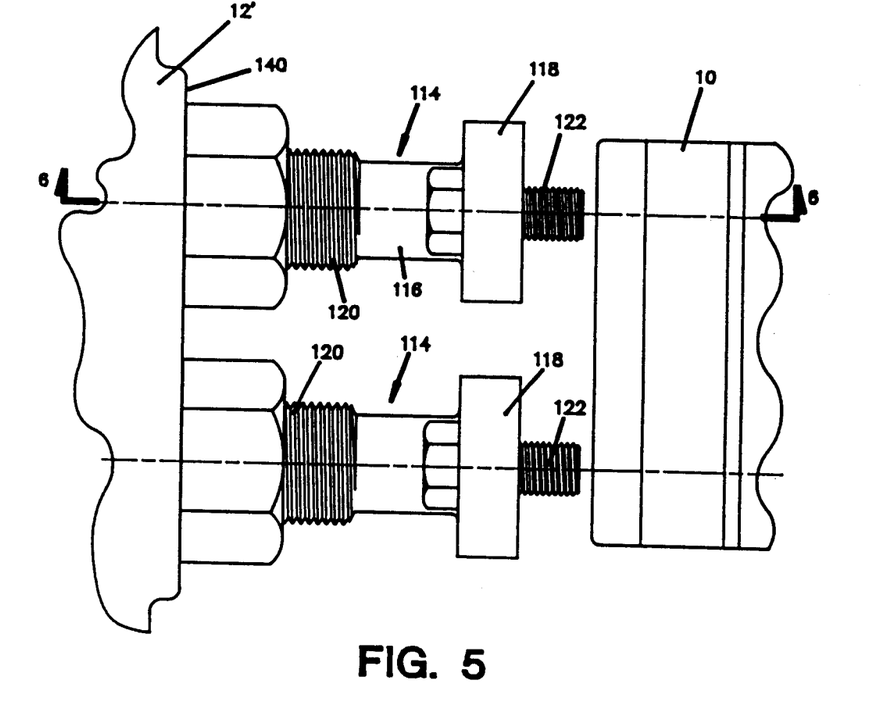
FIG. 5 is a pictorial view of still another embodiment of a stabilized connector flange aligned for bolted connection with an instrument manifold.
Figure 6:
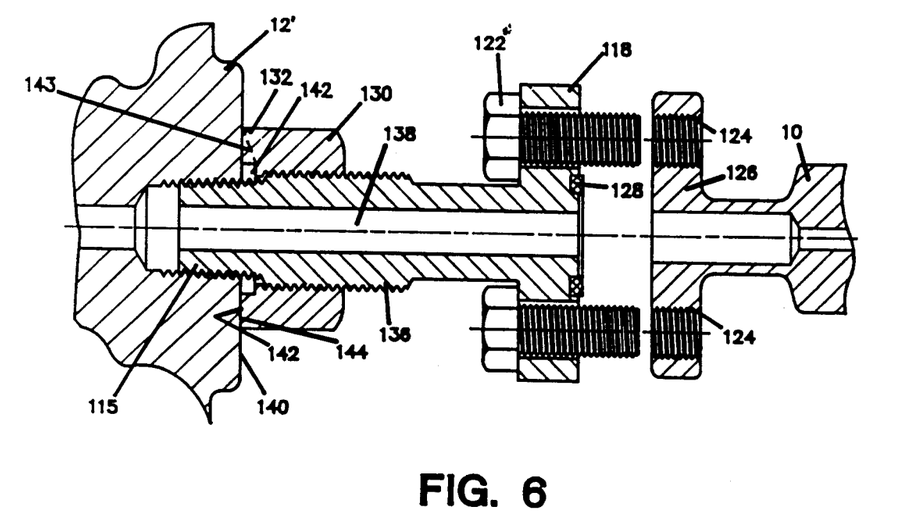
FIG. 6 is a cross-sectional view taken along line 6—6 in FIG. 5.

FIG. 5 is a pictorial view of another embodiment of the present invention, illustrating a pair of identical connector flanges 114 for solely interconnecting and supporting the instrument manifold 10 from an orifice plate assembly 12'. FIG. 5 illustrates the conventional spacing of the connector flanges threaded to the NPT ports in the orifice plate assembly, and illustrates the spaced flange ends 118 generally similar to the flange ends 58 shown in FIG. 2. Each of the connector flange assemblies includes a connector flange 116 with a tapered NPT threaded end 115 (see FIG. 6), a flange end 118 and a threaded portion 120 as previously discussed. A guide portion is not included on each of the connector flanges, since the stabilizer members and tensioning nut are provided as a unitary component. A pair of bolts 122 are provided in each flange end 118 for connecting the instrument manifold 10 thereto. The spacing between the bolts in each connector flange 118 is thus substantially identical to the spacing between the corresponding radially opposing apertures 124 in the instrument manifold. FIG. 6 depicts the through passageway from the orifice plate assembly 12' to the instrument manifold 10. The NPT threads thus form a metal-to-metal seal between each connector flange assembly and the orifice plate assembly, and the O-ring 128 forms a seal between the flange ends 118 and 126.

A stabilizer foot structurally separate from the nut is not provided for the embodiment shown in FIGS. 5 and 6, but rather the stabilizer nut 130 is provided with a circular or ring-shaped stabilizer portion 132 structurally affixed thereto. Accordingly, the threads 136 on portion 120 serve as both a mating thread for the nut, and a guide surface to keep the stabilizer portion 132 substantially aligned with the axis 138. Torqued rotation of the nut 130 thus forces the stabilizer portion 132 into stabilized engagement with the body surface 140 of the orifice plate assembly. Portion 132 may be easily fabricated by boring a cylindrical cavity 142 in the orifice plate assembly facing end of the nut. It should be understood that this cavity may also be conical-shaped such that the portion 132 has a circular edge surface rather than a circular flat surface for engaging the orifice plate assembly.

Since the final torqued rotational position of the nut 130 for achieving rigid and stabilized engagement of the portion 132 with the orifice plate assembly is not controllable, a pair of parallel spaced elongate stabilizer members on a stabilizer foot are not practical. Rather, a single ring-shaped stabilizer member may be provided which is formed as a unitary portion of the nut. Alternatively, a plurality of stabilizer members may be positioned circumferentially about the nut with slots or gaps therebetween. If the body surface 140 of the orifice plate assembly, as shown in FIGS. 5 and 6, is a planar surface, the circular planar end surface of the stabilizer portion 132 is in stabilized engagement with the surface 144.

Providing a stabilizer member within a planar surface for engagement with the orifice plate assembly has a disadvantage in that the corresponding engaging surface of the orifice plate assembly may not be flat, i.e., that surface may be nicked, have burrs thereon, or may not be planar with respect to the central axis of the connector flange. Accordingly, the spaced parallel stabilizer members as shown in FIG. 4 may have an angled exterior surface 95 which defines a sharp edge surface for engaging the exterior planar surface of the orifice plate assembly. Similarly, the exterior surface of the stabilizer member 132 formed as part of the nut 130 in FIG. 6 may have the tapered exterior to define a substantially circular knife edge surface for line contact engagement with the orifice plate assembly.

The components of the stabilized connector flange assemblies according to the present invention are preferably fabricated from stainless steel. The elastomeric seal between the stabilizer flange and the instrument manifold may be formed from any suitable elastomeric materials, including natural or synthetic rubber, Delrin TM, or Teflon TM.

Although the present invention is particularly well-suited for structurally interconnecting an instrument manifold with an orifice plate assembly, it should be understood that the connector flange assemblies as described herein may also be used to interconnect any differential pressure apparatus having a pair of NPT threaded outlet ports with an instrument manifold. Also, the connector flange assemblies of the present invention may be used with various types of instrument manifolds, including threevalve and five-valve instrument manifolds, instrument manifolds with flanges integral to the flange bodies and instrument manifolds with removable flanges. Also, the present invention may be used with various types of differential pressure sensing equipment or transmitters, including differential pressure gauges, meters or recorders.

Other alternative forms of the present invention will suggest themselves from a consideration of the apparatus and techniques described herein. Accordingly, it should be understood that the apparatus and methods described herein and shown in the accompanying drawings are intended as exemplary embodiments of the present invention, and not as limitations thereto.

What is claimed is:

1. A method of structurally interconnecting an instrument manifold with an orifice plate assembly, the instrument manifold having first and second pressure receiving inlet ports, first and second pressure transmitting outlet ports, and plurality of apertures positioned radially outward of a corresponding inlet ports for receiving securing members, the orifice plate assembly including first and second body surfaces and first and second tapered threaded outlet ports each adjoining a respective body surface for transmitting a pressure signal to the instrument manifold, the method comprising:

providing first and second connector flanges each having a central axis and a through passageway, each connector flange formed to include a threaded end fixed thereon, a flange end fixed thereon and including at least first and second apertures each spaced radially outward of the through passageway, and a threaded portion fixed thereon axially between the threaded end and the flange end;

providing first and second stabilizer members;

providing first and second tensioning nuts;

positioning each tensioning nut over the threaded end of a corresponding connector flange such that each tensioning nut is supported on a respective connector flange;

positioning each stabilizer member over the threaded end of a respective connector flange such that each of the stabilizer members is spaced axially between the corresponding tensioning nut and the orifice plate assembly and radially outward of the threaded end of the respective connector flange;

thereafter rotating each of the connector flanges for obtaining metal-to-metal sealing engagement between the threaded end of each of the connector flanges and the respective threaded outlet port in the orifice plate assembly;

while maintaining the metal-to-metal sealing engagement, rotating each of the connector flanges such that each of the plurality of apertures in the flange end are at a preselected rotational position;

thereafter rotating each of the tensioning nuts with respect to the threaded portion of each of the connection flanges such that each of the tensioning nuts exerts a substantially axially directed force on the corresponding stabilizer member to force the stabilizer member into stabilized engagement with the corresponding body surface on the orifice plate assembly; and     fixedly interconnecting the flange end of each of the connector flanges with the instrument manifold while each of the apertures in the flange ends is aligned with the corresponding aperture in the instrument manifold.

2. The method as defined in claim 1, further comprising:

threadably torquing at least one of the first and second connector flanges to the orifice plate assembly such that an axial spacing between instrument facing ends of the first and second connector flanges is minimized.

3. The method as defined in claim 2, wherein at least one of the connector flanges is threadably torqued to the orifice plate assembly such that the axial spacing between the instrument facing ends of the first and second connector flanges is less than about 0.020 inches.

4. The method as defined in claim 3, wherein the step of rotating each of the tensioning nuts includes applying a force of at least 200 foot pounds to each of the tensioning nuts for exerting a high axially directed compressive force on each of the stabilizer members.

5. The method as defined in claim 1, wherein the step of fixedly interconnecting the flange end of each of the connector flanges with the instrument manifold includes positioning the securing members within a respective aperture in the flange end and an aligned aperture in the instrument manifold, and the instrument manifold is structurally connected to the orifice plate assembly solely by the securing members, the first and second connector flanges, the first and second stabilizer members, and the first and second tensioning nuts.

6. The method as defined in claim 1, further comprising:

structurally interconnecting a differential pressure sensor to the instrument manifold, such that the orifice plate assembly supports both the instrument manifold and the differential pressure sensor.

7. The method as defined in claim 1, further comprising:

forming a cylindrically-shaped exterior guide surface having a uniform outer diameter on each of the connector flanges: and     forming a cylindrically-shaped interior surface on each of the stabilizer members having a diameter only slightly greater than the uniform diameter of the guide surface, such that each stabilizer member is axially movable with respect to its connector flange by the corresponding tensioning nut.

8. The method as defined in claim 1, further comprising:

forming each of the stabilizer members and the respective tensioning nut as a unitary member having a cavity in its orifice plate assembly facing end surface radially inward of the stabilizer member, the cavity having a diameter of at least 1.5 times the nominal diameter of the threaded portion of a respective connector flange.

9. A method of structurally interconnecting an instrument manifold with a differential pressure assembly, the instrument manifold having first and second pressure receiving inlet ports, first and second pressure transmitting outlet ports, and plurality of apertures for receiving securing members, the differential pressure assembly including first and second body surfaces and first and second tapered threaded outlet ports each adjoining a respective body surface for transmitting a pressure signal to the instrument manifold, the method comprising:

providing first and second connector flanges each having a central axis and a through passageway, each connector flange formed to include a threaded end fixed thereon, a flange end fixed thereon and including at least first and second apertures each spaced radially outward of the through passageway, and a threaded portion spaced axially between the threaded end and the flange end;

providing first and second stabilizer feet members;

providing first and second tensioning nuts;

positioning each tensioning nut over the threaded end of a corresponding connector flange such that each tensioning nut is supported on a respective connector flange;

positioning each stabilizer feet member over the threaded end of a respective connector flange such that each of the stabilizer feet members is spaced axially between the corresponding tensioning nut and the differential pressure assembly;

thereafter rotating each of the connector flanges to obtain metal-to-metal sealing engagement between the threaded end of each of the connector flanges and the respective threaded outlet port in the differential pressure assembly;

while maintaining the metal-to-metal sealing engagement, rotating each of the connector flanges such that each of the plurality of apertures in the flange end are at a preselected rotational position;

thereafter rotating each of the tensioning nuts with respect to the threaded portion of each of the connector flanges such that each of the tensioning nuts exerts a substantially axially directed force on the corresponding stabilizer feet member to force the stabilizer feet member into stabilized engagement with the corresponding body surface on the differential pressure assembly; and fixedly interconnecting the flange end of each of the connector flanges with the instrument manifold while each of the apertures in the flange ends is aligned with the corresponding aperture in the instrument manifold.

10. The method as defined in claim 9, further comprising:

fixedly securing each of the first and second stabilizer feet members to a respective one of the first and second tensioning nuts; and the step of positioning each stabilizer feet member over the threaded end of the corresponding connector flange includes orienting each of the first and second tensioning nuts such that the corresponding stabilizer feet member is spaced opposite the corresponding connector flange with respect to the corresponding tensioning nut.

11. The method as defined in claim 9, further comprising:

threadably torquing at least one of the first and second connector flanges to the differential pressure assembly such that an axial spacing between instrument facing ends of the first and second connector flange is minimized.

12. The method as defined in claim 11, wherein at least one of the connector flanges is threadably torqued to the differential pressure assembly such that the axial spacing between the instrument facing ends of the first and second connector flanges is less that about 0.020 inches.

13. The method as defined in claim 9, wherein the step of rotating each of the tensioning nuts includes applying a force of at least 200 foot pounds to each of the tensioning nut for exerting a high axially directed compressive force on each of the stabilizer feet members.

14. The method as defined in claim 9, wherein the step of fixedly interconnecting the flange end of each of the connector flanges with the instrument manifold includes positioning the securing members within a respective aperture in the flange end and an aligned aperture in the instrument manifold.

15. The method as defined in claim 9, further comprising:

structurally interconnecting a differential pressure sensor to the instrument manifold, such that the differential pressure assembly supports both the instrument manifold and the differential pressure sensor.

16. The method as defined in claim 9, further comprising:

forming a cylindrically-shaped exterior guide surface having a uniform outer diameter on each of the connector flanges; and forming a cylindrically-shaped interior surface on each of the stabilizer feet members having a diameter only slightly greater than the uniform diameter of the guide surface, such that each stabilizer feet member is axially movable with respect to its connector flange by the corresponding tensioning nut.

17. The method as defined in claim 9, further comprising:

forming each of the stabilizer feet members and the respective tensioning nut as a unitary member having a cavity in its orifice plate assembly facing end surface radially inward of the stabilizer feet member, the cavity having a diameter of at least 1.5 times the nominal diameter of the threaded portion of a respective connector flange.

* * * * *